United States Patent
Kim et al.

(10) Patent No.: US 7,593,295 B2
(45) Date of Patent: Sep. 22, 2009

(54) APPARATUS AND METHOD FOR COMPENSATING FOR DEFECT OF OPTICAL DISC

(75) Inventors: Seung-chul Kim, Anyang-si (KR); Kwan-ho Chun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 723 days.

(21) Appl. No.: 10/940,846

(22) Filed: Sep. 15, 2004

(65) Prior Publication Data

US 2005/0174900 A1 Aug. 11, 2005

(30) Foreign Application Priority Data

Feb. 5, 2004 (KR) ............ 10-2004-0007531

(51) Int. Cl.
*G11B 7/00* (2006.01)

(52) U.S. Cl. .............. 369/44.32; 369/44.29; 369/44.34; 369/44.35; 369/53.16

(58) Field of Classification Search .............. 369/53.16, 369/44.32, 44.34, 44.35, 44.29
See application file for complete search history.

(56) References Cited

U.S. PATENT DOCUMENTS

| | | | | |
|---|---|---|---|---|
| 5,566,141 A | * | 10/1996 | Yamaguchi et al. ...... | 369/30.17 |
| 6,236,032 B1 | * | 5/2001 | Kamiyama ............... | 250/201.5 |
| 6,341,113 B1 | * | 1/2002 | Kamiyama ............... | 369/53.15 |
| 6,754,154 B1 | * | 6/2004 | Takeda et al. ............ | 369/53.19 |
| 6,791,916 B2 | * | 9/2004 | Tateishi et al. ........... | 369/44.32 |
| 6,819,638 B1 | * | 11/2004 | Sakamoto et al. ........ | 369/44.32 |

FOREIGN PATENT DOCUMENTS

| | | |
|---|---|---|
| CN | 1264113 | 8/2000 |
| JP | 5-101415 | 4/1993 |
| JP | 11-16257 | 1/1999 |
| JP | 2000-90467 | 3/2000 |
| JP | 2002-8253 | 1/2002 |
| JP | 2003-281747 | 10/2003 |
| KR | 1997-39810 | 8/1997 |
| KR | 1997-68538 | 12/1997 |
| KR | 2001-87922 | 9/2001 |
| KR | 10-2004-0022096 | 3/2004 |

OTHER PUBLICATIONS

Machine Translation of Japan publication No. 2003281747 by Isa Tatsuo file on Oct. 3, 2003.*

* cited by examiner

*Primary Examiner*—Wayne R Young
*Assistant Examiner*—Linh T Nguyen
(74) *Attorney, Agent, or Firm*—Staas & Halsey LLP

(57) ABSTRACT

An apparatus for and a method of compensating for a defect of an optical disc. The method includes: detecting a disc defect zone according to an RF sum signal level read from the optical disc; inverting a phase of a tracking error signal generated during a first specified time from the start of the defect zone; and holding a tracking servo control by adding components of the inverted tracking error signal to a tracking drive signal for a second specified time.

18 Claims, 4 Drawing Sheets

APPARATUS AND METHOD FOR COMPENSATING FOR DEFECT OF OPTICAL DISC

CROSS-REFERENCE TO RELATED APPLICATION

This application claims the priority of Korean Patent Application No. 2004-7531, filed on Feb. 5, 2004, in the Korean Intellectual Property Office, the disclosure of which is incorporated herein by reference.

BACKGROUND OF THE INVENTION

1. Field of the Invention

The present invention relates to an optical disc recording/reproducing apparatus, and more particularly, to an optical disc defect compensating apparatus and method for improving servo stability when a defect is generated.

2. Description of Related Art

An optical disc recording/reproducing apparatus reproduces information recorded on various kinds of optical discs, such as compact discs (CDs), compact disc-read only memories (CD-ROMs), digital video discs (DVDs), CD-Rs, CD-RWs, DVD-RWs, and DVD-Rs, and records data on the optical discs. The optical disc driving apparatus adapts various servo controls including a mechanical driving control for picking-up RF signals from the discs.

The optical disc recording/reproducing apparatus reproduces a signal according to the intensity of reflected light detected using a non-contact optical head. Since the optical disc recording/reproducing apparatus uses a non-contact optical head, compared to a recording/reproducing apparatus using a contact head, such as a tape cassette deck, quality deterioration can be prevented and reproduction capability is relatively strong.

However, when an optical disc is not handled carefully and/or not stored in a cartridge, for example, the surfaces of the disc can be easily damaged. Typical optical disc defects include scratches or dust buildup on the surface of the optical disc, and interruption, which occurs when zones are omitted during a disc manufacturing process.

Such defects cause reproduced signals to be distorted or omitted, and can even render reproduction of signals impossible, by causing servo signals essential to reproduction to malfunction. In such a case, an optical reproducing apparatus holds a servo signal whenever a specific defect is detected and generates the servo signal again when a defect zone ends.

A conventional defect compensation method will now be described with reference to FIG. 1.

An analog-to-digital converter (ADC) 110 converts an analog tracking error signal generated on a disc into a digital tracking error signal. A high-frequency component compensator 130 compensates for a phase and a gain of a high-frequency component of a tracking error signal. An anti-aliasing filter 160 performs anti-aliasing of the tracking error signal generated by the ADC 110. A low-frequency component compensator 170 compensates for a phase and a gain of the anti-aliased tracking error signal. An adder 140 adds the tracking error signal output from the high-frequency component compensator 130 and the tracking error signal output from the low-frequency component compensator 170 and converts the added signal into a tracking drive signal. A digital-to-analog converter (DAC) 150 converts the tracking drive signal into an analog drive signal and outputs the analog drive signal. When a defect zone where an RF sum signal drops below a specified level is detected, a defect flag is changed to a logic high state, and a contact point 3 of a switch 120 is connected to a contact point 2. Therefore, a hold filter 180 extracts a DC component of the tracking error signal passing through the anti-aliasing filter 160. A register 190 stores the DC component extracted by the hold filter 180. When the defect flag is changed to the logic high state due to defect detection, a servo is held during the defect zone by inputting the DC component stored in the register 190 to the high-frequency component compensator 130. However, at the point of time when the defect flag is changed to the logic high state due to the defect detection, since an error component already exists in the tracking error signal, the servo is unstable. Therefore, since a disc defect is already reflected in the DC component stored in the register 190, if the DC component is used for servo holding, the servo becomes unstable not only during the defect zone but also after the defect zone ends.

FIG. 2 shows waveforms of a defect zone where an RF sum signal drops below a specified level. Referring to FIG. 2, in waveforms at points of time when a tracking servo is turned on again after being held due to sensing of a defect zone, a tracking error (TE) signal and a tracking drive (TRO) signal are severely unstable. That is, since an error component already exists in the TE signal at a point of time when the defect zone is sensed, an output signal is more unstable when passing through the defect zone due to influence of the error component. Therefore, with only a conventional servo holding algorithm, instability in a servo at the start of a defect zone, and increased instability when the defect zone ends, cannot be compensated for. If the TRO signal becomes severely unstable when a servo hold ends, an optical focus may deviate from a current track to an adjacent track.

BRIEF SUMMARY

Embodiments of the present invention provide an optical disc defect compensating apparatus and method by which instability of a tracking error signal is cancelled by sampling the instability of the tracking error signal at a point of time when a defect begins and outputting a tracking drive signal having a phase opposite to that of the tracking error signal.

According to an aspect of the present invention, there is provided a method of compensating for a defect of an optical disc, including: detecting a disc defect zone according to an RF sum signal level read from the optical disc; inverting a phase of a tracking error signal generated during a first specified time from the start of the defect zone; and holding a tracking servo control by adding components of the inverted tracking error signal to a tracking drive signal for a second specified time.

According to another aspect of the present invention, there is provided an optical recording/reproducing apparatus including: an optical pickup which converts optically detected information recorded on a disc into an electrical RF signal; an RF amplifier which generates a focus error signal and a tracking error signal by amplifying the RF signal output from the optical pickup; and a servo signal processing unit which outputs a tracking drive signal by compensating for a gain and phase of the tracking error signal generated by the RF amplifier, inverting the phase of the tracking error signal during a specified time from the start of a defect zone, and adding the phase-inverted tracking error signal to the tracking drive signal.

According to yet another aspect of the present invention, there is provided a reproducing apparatus including: an optical pickup which converts optically detected information recorded on a disc into an electrical RF signal; an RF amplifier which generates a focus error signal and a tracking error signal by amplifying the RF signal output from the optical pickup; and a servo signal processing unit which outputs a tracking drive signal by compensating for a gain and phase of the tracking error signal generated by the RF amplifier, inverting the phase of the tracking error signal during a specified time from the start of a defect zone, and adding the phase-inverted tracking error signal to the tracking drive signal.

According to another aspect of the present invention, there is provided a method of improving servo stability, including: sampling the instability of the tracking error signal when a defect begins; outputting a tracking drive signal having a phase opposite to that of the sampled tracking error signal; and removing a DC offset generated after the defect zone ends by adding a high-frequency signal whose phase only is inverted, to a compensated tracking drive signal.

According to another aspect of the present invention, there is provided a method of compensating for instability of a tracking error (TE) signal, including: sampling a value of the TE signal; inverting a phase of the TE signal to yield a phase-inverted TE signal; and using the phase-inverted TE signal as at least part of a compensated tracking drive (TRD) signal during tracking in a disc defect zone.

According to another aspect of the present invention, there is provided a method of improving servo stability, including: sampling a value of the TE signal; inverting a phase of the TE signal to yield a phase-inverted TE signal; and using the phase-inverted TE signal as at least part of a compensated tracking drive (TRD) signal during tracking in a disc defect zone.

According to another aspect of the present invention, there is provided a method of removing a DC offset generated right after a defect zone ends, including: inverting a phase of a high-frequency signal to yield a phase-inverted high-frequency signal; and adding the phase-inverted high-frequency signal a compensated tracking drive (TRD) signal.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENT

Figure 1:
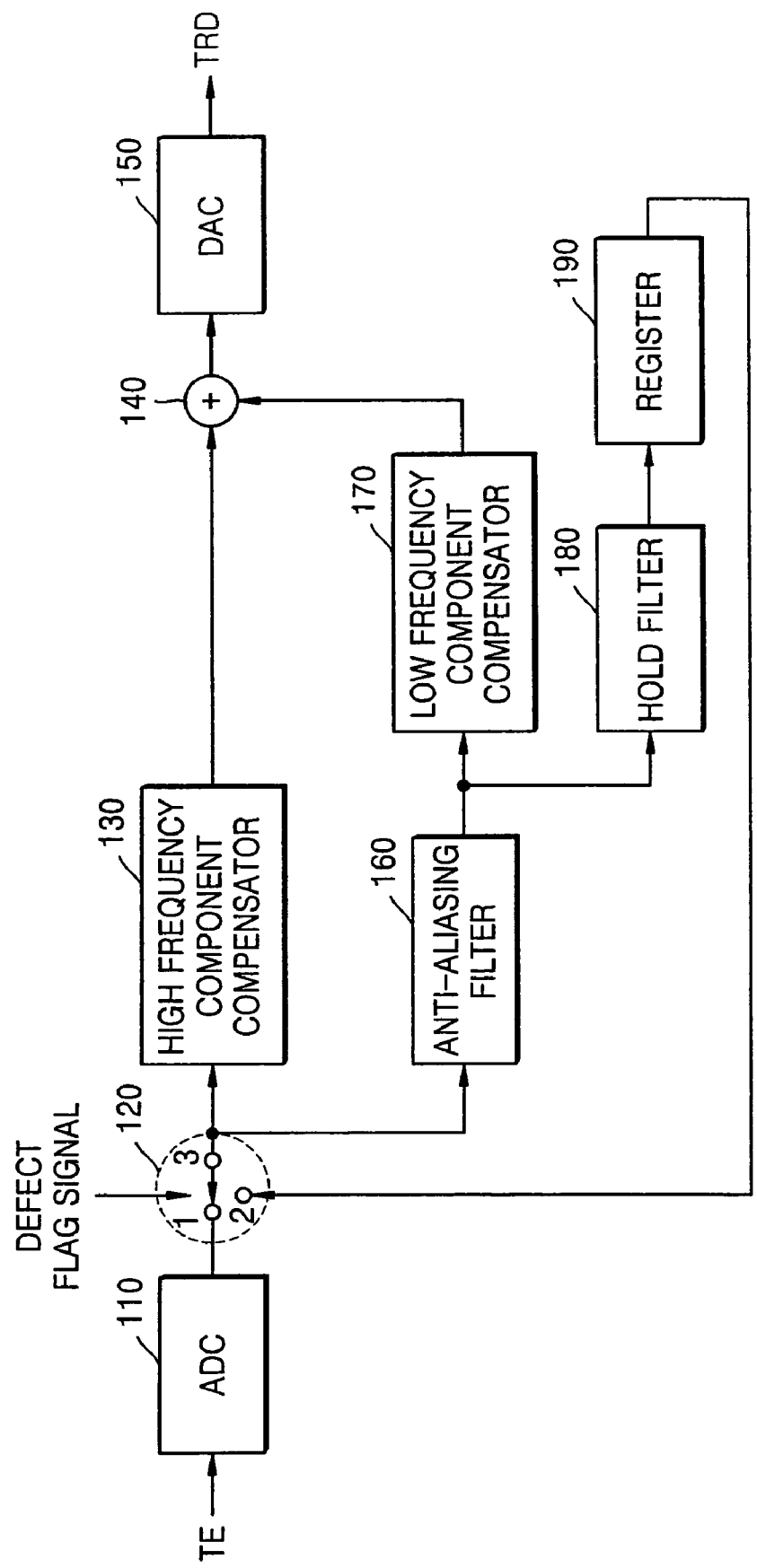
FIG. 1 is a block diagram of a conventional disc defect compensating apparatus.
Figure 2:
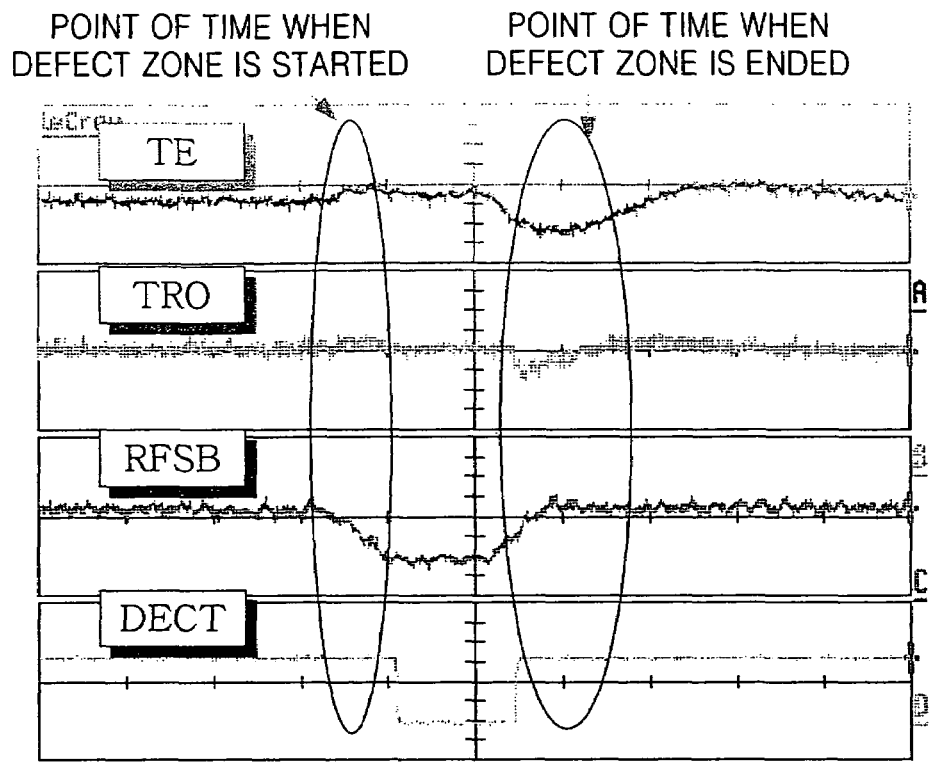
FIG. 2 is a graph showing signal waveforms in a defect zone of an optical disc.

Reference will now be made in detail to an embodiment of the present invention, an example of which are illustrated in the accompanying drawings, wherein like reference numerals refer to the like elements throughout. The embodiment is described below to explain the present invention by referring to the figures.

Figure 3:
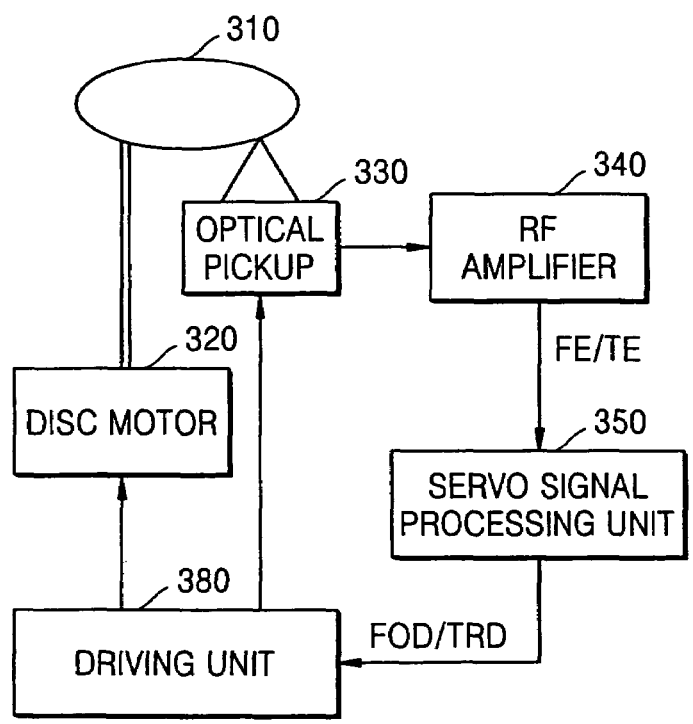
FIG. 3 is a block diagram of an optical disc recording/reproducing apparatus according to an embodiment of the present invention.

FIG. 3 is a block diagram of an optical disc recording/reproducing apparatus according to an embodiment of the present invention.

An optical pickup 330, which is driven by a tracking actuator (not shown) for controlling a tracking servo, and a focusing actuator (not shown) for controlling a focus servo, optically detects information recorded on a disc 310 and converts the information into an electrical RF signal.

An RF amplifier 340 amplifies the RF signal output from the optical pickup 330. Here, the RF amplifier 340 generates a focus error (FE) signal and a tracking error (TE) signal from the amplified RF signal using a built-in FE detecting circuit (not shown) and a built-in TE detecting circuit (not shown).

A servo signal processing unit 350, which includes a focus servo control loop (not shown) and a tracking servo control loop (not shown), outputs a compensated focus drive (FOD) signal and a compensated tracking drive (TRD) signal using gains and phases of the FE signal and TE signal generated by the RF amplifier 340. In particular, the servo signal processing unit 350 inverts the phase of the TE signal generated during a specified time starting from the start of a disc defect zone and adds the inverted TE signal component to the TRD signal for a specified time.

A driving unit 380 drives a disc motor 320 and the focusing and tracking actuators included in the optical pickup 330 by respectively using the FOD signal and the TRD signal output from the servo signal processing unit 350.

The disc motor 320 rotates the disc 310 according to a constant linear velocity (CLV) method or a constant angular velocity (CAV) method using a disc driving signal output from the driving unit 380.

Figure 4:
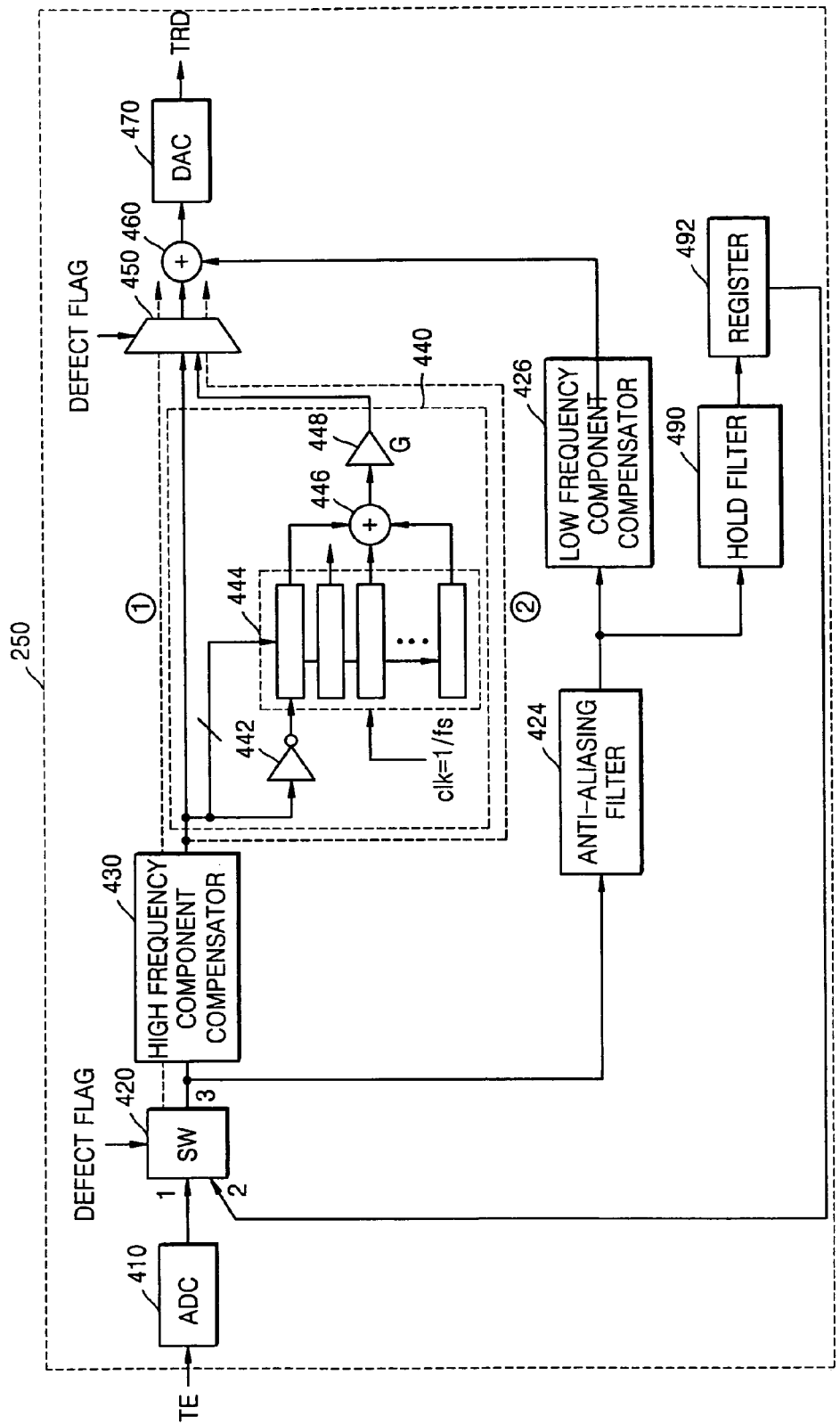
FIG. 4 is a block diagram of the servo signal processing unit shown in FIG. 3.

FIG. 4 is a block diagram of the servo signal processing unit 350 shown in FIG. 3, for compensating for a defect of an optical disc.

Referring to FIG. 4, an ADC 410 converts an analog TE signal into a digital TE signal.

A high-frequency component compensator 430 compensates for a phase and gain of the high-frequency component output from the ADC 410.

An anti-aliasing filter 424 performs anti-aliasing of the digital TE signal.

A low-frequency component compensator 426 compensates for a phase and gain of an anti-aliased low-frequency component.

A switching unit 420 selectively outputs a TE signal detected from a disc or a DC component stored in a register 470 according to a defect flag signal. That is, the switching unit 420 connects a contact point 3 to a contact point 1 in normal operation, and if a defect flag is changed to a logic high state, the switching unit 420 connects the contact point 3 to a contact point 2.

A defect compensator 440 inverts a phase of the TE signal generated during a specified time from the start of a defect zone. That is, the defect compensator 440 can generate a signal whose phase only is inverted, regardless of whether a direction of the TE signal is "+" or "−", by inverting only most significant bits (MSBs) of sampled values of the unstable TE signal for a specified time. In more detail, if an unstable frequency is about 30-40 kHz when a defect zone with a length of 1-2 mm begins in a high multiple speed, around 4-8 sampled values are converted into digital values and input to the high-frequency component compensator 430. A bit inverter 442 inverts only the MSBs of the sampled values. A register unit 444 sequentially stores the sampled values output from the high-frequency component compensator 430 by synchronizing them with a sampling clock. The number of registers depends on the number of sampled values. If a defect flag is in a logic high state, an integrator 446 integrates a plurality of sampled values stored in the register unit 444. A gain regulator 448 regulates a gain of the signal regulated in the integrator 446.

A selector 450 selectively outputs the signal output from the high-frequency component compensator 430 or the signal output from the defect compensator 440 according to the defect flag signal. For example, a path ① is selected when a disc is reproduced normally, and a path ② is selected during a specified time starting from when the disc defect flag changes to a logic high state.

A hold filter 490 extracts a DC component from the TE signal output via the anti-aliasing filter 424. A register 492 stores the DC component extracted by the hold filter 490. When the defect flag is in the logic high state due to detection of a defect, a servo is held during a defect zone by inputting the DC component of the TE signal stored in the register 492 to the high-frequency component compensator 430.

An adder 460 adds the TE signal output from the selector 450 and the TE signal output from the low-frequency component compensator 426.

A DAC 470 converts the TE signal output from the adder 460 into an analog TRD signal.

Figure 5:
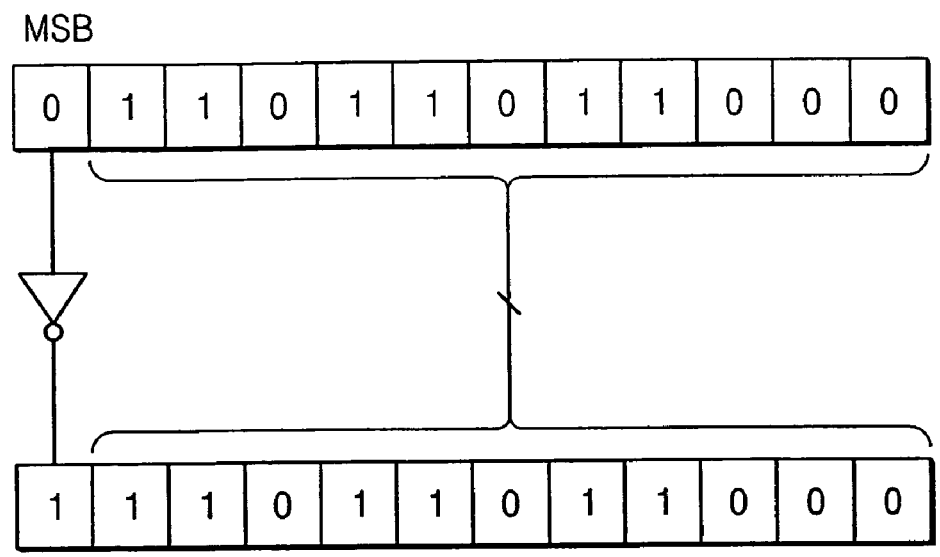
FIG. 5 illustrates a signal conversion method of a defect compensator of the type shown in FIG. 3.

FIG. 5 illustrates a signal conversion method of the defect compensator 440 of FIG. 4.

Referring to FIG. 5, if it is assumed that a sampling value is represented using 12 bits, the sampling value is stored in the register 492 of FIG. 4 by changing the MSB of the 12 bits from "0" to "1" and maintaining the other bits as they are.

Figure 6:
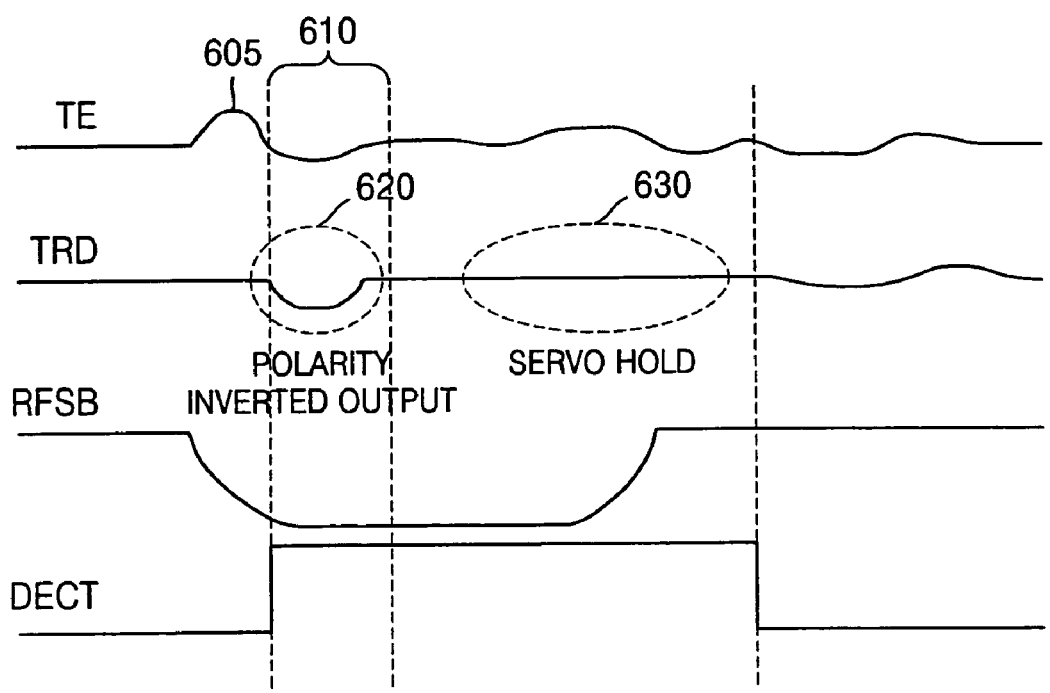
FIG. 6 is a timing graph for compensating for instability of a tracking error signal.

A method of compensating for instability of a TE signal will now be described with reference to the illustrated waveforms of FIG. 6.

When an optical disc is reproduced, if an RF sum signal drops below a specified level, the zone is detected as a defect zone. At a point of time when the defect zone starts, a value sampling instability 605 of a 176.4 kHz TE signal is input to the high-frequency component compensator 430 of FIG. 4. (If the disc defect zone is not detected, a TRD signal output from the high-frequency component compensator 430 of FIG. 4 is input to the adder 460 of FIG. 4 as is.) A phase of the TE signal is inverted and the phase-inverted TE signal is generated as the TRD signal during a specified time starting from change of a defect flag DECT to a logic high state due to detection of the disc defect zone. Therefore, during the defect zone (610), the TRD signal includes a phase-inverted signal 620 and a servo holding DC voltage 630. That is, the present embodiment uses the conventional servo holding algorithm, however, instability of a servo error is compensated for by inverting only an output phase of the high-frequency component compensator 430 of FIG. 4 when the defect flag is in the logic high state.

According to the above-described embodiment of the present invention, servo stability can be improved by compensating for instability of a TE signal using an inverter at the start of a defect zone. Also, instability of a servo error can be compensated for during a specified time starting from a point of time when a defect flag changes to a logic high state by simply adding only a register and control logic to conventional hardware. Also, a DC offset generated right after the defect zone ends can be removed by adding a high-frequency signal whose phase only is inverted, to a TRD signal.

Although an embodiment of the present invention have been shown and described, it would be appreciated by those skilled in the art that changes may be made in this embodiment without departing from the principles and spirit of the invention, the scope of which is defined in the claims and their equivalents.

What is claimed is:

1. A method of compensating for a defect of an optical disc, comprising:
   detecting a disc defect zone according to an RF sum signal level read from the optical disc;
   inverting a phase of a tracking error signal generated during a first specified time from the start of the defect zone; and
   holding a tracking servo control by adding components of the inverted tracking error signal to a tracking drive signal for a second specified time,
   wherein the inverting includes:
      sampling the tracking error signal generated during the predetermined time from the start of the defect zone;
      inverting most significant bits of the sampled values; and
      integrating the sampled values including the inverted most significant bits.

2. The method of claim 1, wherein the inverting includes inverting a phase of the tracking error signal, whose high-frequency component is compensated for, during a specified time starting from a point of time when a defect flag is changed to a logic high state.

3. An optical recording/reproducing apparatus comprising:
   an optical pickup which converts optically detected information recorded on a disc into an electrical RF signal;
   an RF amplifier which generates a focus error signal and a tracking error signal by amplifying the RF signal output from the optical pickup; and
   a servo signal processing unit which outputs a tracking drive signal by compensating for a gain and phase of the tracking error signal generated by the RF amplifier, inverting the phase of the tracking error signal during a specified time from the start of a defect zone, and adding the phase-inverted tracking error signal to the tracking drive signal, the inverting including sampling the tracking error signal generated during the predetermined time from the start of the defect zone, inverting most significant bits of the sampled values, and integrating the sampled values including the inverted most significant bits.

4. The apparatus of claim 3, wherein the servo signal processing unit includes:
   a high-frequency component compensator which compensates for a phase and gain of a high-frequency component of the tracking error signal;
   a low-frequency component compensator which compensates for a phase and gain of a low-frequency component of the tracking error signal;
   a defect compensator which inverts the phase of the tracking error signal output from the high-frequency component compensator during the specified time from the start of the defect zone;
   a selector which selectively outputs the signal output from the high-frequency component compensator or the signal output from the defect compensator according to a defect flag signal generated when a defect is detected; and
   an adder which adds the low-frequency tracking error signal compensated by the low-frequency component compensator and the high-frequency tracking error signal selected by the selector and outputs the result as the tracking drive signal.

5. The apparatus of claim 4, wherein the defect compensator includes:

a bit inverter which inverts most significant bits of the sampled values output from the high-frequency component compensator;

a register unit which sequentially stores sampled values including the inverted most significant bits output from the bit inverter;

an integrator which integrates the sampled values stored in the register unit when the defect flag is in a logic high state;

a gain regulator which regulates a gain of the signal integrated by the integrator.

6. The apparatus of claim 4, wherein the tracking error signal is digital and the apparatus further comprises an analog to digital converter which converts an analog tracking error signal into the digital tracking error signal.

7. The apparatus of claim 6, further comprising an anti-aliasing filter which anti-aliases the digital tracking error signal.

8. The apparatus of claim 7, further comprising:
a hold filter which extracts a DC component from the anti-aliased tracking error signal;
a register which stores the DC component; and
a switching unit which, according to a defect flag signal, selectively outputs the tracking error signal detected from the disc or a DC component stored in the register.

9. The apparatus of claim 4, further comprising a digital to analog converter which converts the tracking drive signal output by the adder into an analog tracking drive signal.

10. The apparatus of claim 3, wherein the optical pickup includes a tracking servo which is driven by a tracking actuator and a focusing servo which is driven by a focusing actuator.

11. The apparatus of claim 10, further comprising a driving unit which drives the focusing actuator and the tracking actuator using the tracking drive signal output from the servo signal processing unit.

12. The apparatus of claim 10, further comprising a drive unit which drives a disc motor which rotates the disc.

13. The apparatus of claim 3, wherein the RF amplifier includes a built-in focus error detecting circuit and a built-in tracking error detecting circuit which respectively generate the focus error signal and the tracking error signal.

14. A reproducing apparatus comprising:
an optical pickup which converts optically detected information recorded on a disc into an electrical RF signal;
an RF amplifier which generates a focus error signal and a tracking error signal by amplifying the RF signal output from the optical pickup; and
a servo signal processing unit which outputs a tracking drive signal by compensating for a gain and phase of the tracking error signal generated by the RF amplifier, inverting the phase of the tracking error signal during a specified time from the start of a defect zone, and adding the phase-inverted tracking error signal to the tracking drive signal, the inverting including sampling the tracking error signal generated during the predetermined time from the start of the defect zone, inverting most significant bits of the sampled values, and integrating the sampled values including the inverted most significant bits.

15. A method of improving servo stability, comprising:
sampling the instability of the tracking error signal when a defect begins;
outputting a tracking drive signal having a phase opposite to that of the sampled tracking error signal; and
removing a DC offset generated after the defect zone ends by adding a high-frequency signal whose phase only is inverted, to a compensated tracking drive signal.

16. A method of compensating for instability of a tracking error (TE) signal, comprising:
sampling a value of the TE signal;
inverting a phase of the TE signal to yield a phase-inverted TE signal; and
using the phase-inverted TE signal as at least part of a compensated tracking drive (TRD) signal during tracking in a disc defect zone,
wherein the inverting includes:
sampling the tracking error signal generated during the predetermined time from the start of the defect zone;
inverting most significant bits of the sampled values; and
integrating the sampled values including the inverted most significant bits.

17. A method of improving servo stability, comprising:
sampling values of a TE signal;
inverting a phase of the TE signal to yield a phase-inverted TE signal by inverting most significant bits of the sampled values and integrating the sampled values including the inverted most significant bits; and
using the phase-inverted TE signal as at least part of a compensated tracking drive (TRD) signal during tracking in a disc defect zone.

18. A method of removing a DC offset generated right after a defect zone ends, comprising:
inverting a phase of a high-frequency signal to yield a phase-inverted high-frequency signal; and
adding the phase-inverted high-frequency signal a compensated tracking drive (TRD) signal.

* * * * *